(12) United States Patent
Tanimura et al.

(10) Patent No.: US 6,315,962 B1
(45) Date of Patent: *Nov. 13, 2001

(54) OZONE PRODUCING APPARATUS

(75) Inventors: Yasuhiro Tanimura; Junji Hirotsuji; Shigeki Nakayama; Hisao Amitani; Hiroshi Yuge; Tateki Ozawa, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,754

(22) Filed: Jul. 8, 1998

(30) Foreign Application Priority Data

Jul. 24, 1997 (JP) .................................................. 9-198435

(51) Int. Cl.⁷ .............................. B01J 19/08; B01J 19/12
(52) U.S. Cl. ............................. 422/186.07; 422/186.08; 422/186.11; 422/186.15
(58) Field of Search ..................... 422/186.07, 186.08, 422/186.11, 186.15; 210/760

(56) References Cited

U.S. PATENT DOCUMENTS

| 4,430,306 | 2/1984 | Namba et al. . |
| 4,453,953 | 6/1984 | Tanaka et al. . |
| 4,552,659 | 11/1985 | Tabata et al. . |
| 5,520,887 | * 5/1996 | Shimizu et al. ................. 422/186.08 |
| 5,888,271 | * 3/1999 | Tanimura et al. ....................... 95/12 |

FOREIGN PATENT DOCUMENTS

| 52-3595 | 1/1977 | (JP) . |
| 52035788 A | * 3/1977 | (JP) . |
| 55-61984 | 5/1980 | (JP) . |

OTHER PUBLICATIONS

JPO Abstract of JP 409156903 A, Jun. 1997.*

Patent Abstracts of Japan, vol. 007, No. 034 (C–150), Feb. 10, 1983, JP 57 188406, Nov. 19, 1982.

Patent Abstracts of Japan, vol. 097, No. 010, Oct. 31, 1997, JP 09 142808, Jun. 3, 1997.

Patent Abstracts of Japan, vol. 001, No. 070 (C–019), Jul. 8, 1977, JP 52 035788, Mar. 18, 1977.

Patent Abstracts of Japan, vol. 009, No. 052 (C–269), Mar. 6, 1985, JP 59 193192, Nov. 1, 1984.

Patent Abstracts of Japan, vol. 3, No. 50 (C–44), Apr. 27, 1979, JP 54 024293, Feb. 23, 1979.

* cited by examiner

*Primary Examiner*—Kathryn Gorgos
*Assistant Examiner*—Wesley A. Nicolas
(74) *Attorney, Agent, or Firm*—Oblon, Spivak, McClelland, Maier & Neustadt, P.C.

(57) ABSTRACT

An ozone producing apparatus includes an ozone generator for generating ozonized oxygen, an adsorption/desorption tower for adsorbing and storing ozone from the ozonized oxygen, and an ozone desorbing device for desorbing adsorbed and stored ozone for supply, wherein the apparatus further includes an oxygen gas supply tank for supplying oxygen to the adsorption/desorption tower at the time that desorption is started and an oxygen gas flow rate adjusting valve for adjusting flow rate of the oxygen gas to, be supplied. Ozone injection can be made definite, and the apparatus is economical in the aspect of both initial and running costs. It presents great effects of preventing slime adhesion and can also limit generation of oxidants even when applied to sea water.

3 Claims, 10 Drawing Sheets

OZONE PRODUCING APPARATUS

BACKGROUND OF THE INVENTION

1. Field of the Invention

The present invention relates to an ozone producing apparatus. More particularly, it relates to an ozone producing apparatus for continuously producing ozone and storing the same in an adsorbed state and supplying the ozone when required by desorbing (separating) the same.

2. Description of the Related Art

While a large quantity of cooling water is used at power stations and in chemical industries, microorganisms or seaweed in the water cause slime hazards and thereby resulting in blockage of canals or deterioration of heat exchange efficiency. One method which might be taken as a countermeasure to prevent such troubles is to employ ozone water of high density. In order to produce high density ozone water, it is more advantageous to employ a so-called intermittent ozone producing method, wherein a small sized ozone generator of small capacity is used to store the produced ozone by using an adsorbent over a long period and to take this stored ozone out from the adsorbent when required for producing high density ozone water, rather than producing ozone with an ozone generator of large capacity, in view of initial and running costs.

An ozone producing apparatus employing such an ozone producing method is known to comprise the following components as shown in FIG. 10: an ozone generator 50, an oxygen supply source 51, a circulating blower 52, an adsorption/desorption tower 53, a cooling source 54, a heating source 55, a water flow ejector 56 and switch valves 57a to 57g. The adsorption/desorption tower 53 is of a double cylinder type of which an inner cylinder is filled with an ozone absorbent and an outer cylinder with heating medium. Silica gel might be employed as the ozone absorbent, and ethylene glycol or an alcohol group as the heating medium. It should be noted that the circulating blower 52, ozone generator 50 and adsorption/desorption tower 53 constitute, in this order, a circulating system.

Operations of the apparatus will now be explained. There are two operations in total, namely ozone adsorbing operation, and ozone desorbing operation.

The adsorbing operation will first be explained. Oxygen is supplied by the oxygen supply source 51 so that the pressure in the circulating system is always constant. In this case, the pressure is normally maintained at 1.5 kg/cm². When oxygen is made to flow in the circulating system by the circulating blower 52 while the switch valves 57c and 57d are in an opened condition, a part of the oxygen is converted into ozone to generate an ozonized oxygen while passing through the discharge space of the ozone generator 50, and the ozonized oxygen is then transferred to the adsorption/desorption tower 53. The adsorbent in the adsorption/desorption tower 53 selectively adsorbs ozone, and the remaining oxygen is returned to the circulating blower 52 through the switch valve 57c. Oxygen which has been consumed as ozone to be absorbed is supplemented through the oxygen supply source 51. Since the adsorbent assumes a property that adsorption capacity of ozone varies depending on temperature, the absorbent is cooled by the cooling source 54 to not more than −30° C. That is, the lower the temperature becomes, an amount of ozone absorption increases, while the higher the temperature becomes, it decreases. Accordingly, the temperature of absorbent is raised by the heating source 55 when desorbing ozone.

When the adsorbent in the adsorption/desorption tower 53 has adsorbed ozone to approach the ozone saturation adsorption amount, the desorbing operation of ozone is performed. In the desorbing operation, operations of the ozone generator 50, circulating blower 52 and cooling source 54 are terminated and the switch valves 57a to 57d are closed. Thereafter, the heating source 55 and water flow ejector 56 start their operation and switch valves 57e to 57g are opened. At this time, temperature of the adsorbent is raised by applying heat through the heating source 55 so that ozone which has been adsorbed by the adsorbent can easily be desorbed therefrom. By depressing to suck ozone in the adsorption/desorption tower 53 by means of the water flow ejector 56, ozone is dispersed into water in the water flow ejector 56 to be dissolved and sent to, as ozone water, places where it is used. When the desorbing period is completed in this way, the process returns to the initial adsorbing operation and is continuously repeated.

In preventing slime adhesion, it is important to perform treatment with high density ozone in a short time. In other words, the maximum peak density of the desorbed ozone becomes important. However, the density of ozone water can not be stabilized with a conventional apparatus as shown in FIG. 10, since the ozone desorption density decreases with a time lapse for desorption, and when a density exceeding a specified density is required for a specified period, ozone can not be effectively used. That is, when employed for slime prevention, not all of the adsorbed and stored ozone can be desorbed in a short time to be injected in a pulse-like manner, and after the density of desorbed ozone reaches a peak density, ozone of low density which is not so much effective in preventing adhesion of slime is desorbed. As discussed earlier, this is not only uneconomical but might also generate oxidants when applied to sea water which badly effect marine products. Further, there also exists a drawback that a huge amount of energy is consumed at the time of storing ozone, since the adsorbent needs to be cooled when adsorbing ozone and the adsorbent needs to be heated when desorbing ozone.

There has been proposed an intermittent-type ozone supplying apparatus, in contrast to such an apparatus described above, in which a canal for adsorbing and supplying ozone is provided with a by-pass circuit including switch valves and channel resistance (refer to Japanese Examined Patent Publication No. 284/1990). However, although such a supplying apparatus is capable of maintaining density of ozone water, it is difficult to generate ozone water of high density therewith.

On the other hand, there is known an intermittent-type ozone supplying apparatus in which a serpentine the pipe is disposed in an inner cylinder for raising the temperature of the adsorbent (refer to Japanese Examined Patent Publication No. 34484/1985). However, such a supplying apparatus presents drawbacks that oxygen-containing gas (with an oxygen density of not less than 80 wt %) from the ozone generator remains in the adsorption/desorption tower immediately before the desorption is performed, and that desorption by heating alone requires a long time for treatment so that the amount of decomposed ozone during this time becomes also high, whereby this apparatus is not suitable for efficiently desorbing stored ozone in a short time, and ozone of low density also is desorbed in the latter half of the desorbing process which is difficult to be injected in a pulse-like manner.

The present invention has been made in view of the above circumstances, and it is an object of the present invention to provide an economical ozone producing apparatus which is capable of decreasing the amount of energy required at the time of storing ozone, and with which little byproducts such as oxidants are generated by enabling definite ozone injection, that is, taking out stored ozone of high density as much as possible in a short time.

SUMMARY OF THE INVENTION

The ozone producing apparatus according to a first invention comprises an ozone generator for generating ozonized oxygen, an adsorption/desorption tower for adsorbing and storing ozone from the ozonized oxygen generated by the ozone generator, and an ozone desorbing means for desorbing adsorbed and stored ozone for supply, wherein the apparatus further includes an oxygen gas supply means for supplying oxygen to the adsorption/desorption tower at the time that of desorption is started and an oxygen gas flow rate adjusting means for adjusting flow rate of the oxygen gas to be supplied.

The ozone producing apparatus according to a second invention includes a gas control means for adjusting, when desorbing adsorbed and stored ozone, pressure in the adsorption/desorption tower to not more than the atmospheric pressure.

The ozone producing apparatus according to a third invention includes a temperature control means for maintaining, when desorbing adsorbed and stored ozone, temperature in the adsorption/desorption tower to be a temperature at the time of adsorption and storage.

The ozone producing apparatus according to a fourth invention comprises an ozone generator for generating ozonized oxygen, an adsorption/desorption tower for adsorbing and storing ozone from the ozonized oxygen generated by the ozone generator, and an ozone desorbing means for desorbing adsorbed and stored ozone for supply, wherein the apparatus further includes an exhausting means for exhausting gas in the adsorption/desorption tower when desorption is started.

The ozone producing apparatus according to a fifth invention is characterized in that after exhausting gas within the adsorption/desorption tower, a small amount of oxygen is made to flow into the adsorption/desorption tower.

The ozone producing apparatus according to a sixth invention comprises an ozone generator for generating ozonized oxygen, an adsorption/desorption tower for adsorbing and storing ozone from the ozonized oxygen generated by the ozone generator, and an ozone desorbing means for desorbing adsorbed and stored ozone for supply, wherein the apparatus includes a tank for storing desorbed ozone.

The ozone producing apparatus according to a seventh invention comprises an ozone generator for generating ozonized oxygen, an adsorption/desorption tower for adsorbing and storing ozone from the ozonized oxygen generated by the ozone generator, and an ozone desorbing means for desorbing the adsorbed and stored ozone for supply, wherein the apparatus further includes an ozone densitometer for measuring a density of desorbed ozone and a control circuit for sending a desorption terminating control signal for terminating the desorption when a measured value of the ozone density at the time of desorption has fallen to a predetermined value after having reached a maximum value.

DETAILED DESCRIPTION OF THE INVENTION

Embodiment 1

Figure 1:
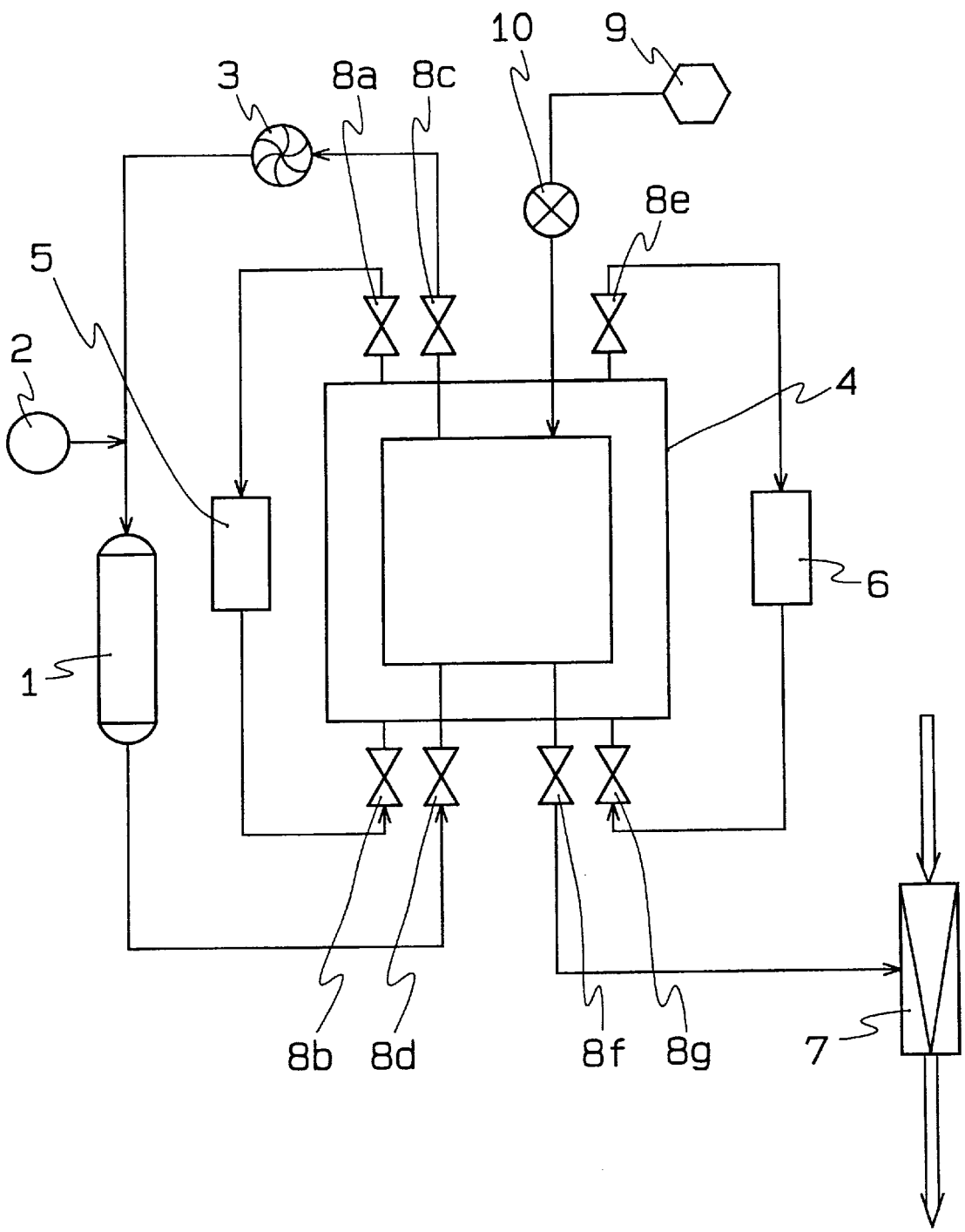
FIG. 1 is a diagram showing an arrangement of an ozone producing apparatus according to Embodiment 1 of the present invention.

FIG. 1 is a diagram showing an arrangement of an ozone producing apparatus according to Embodiment 1 of the present invention Such an apparatus comprises, as shown in FIG. 1, an ozone generator 1 for generating ozonized oxygen, an oxygen supply source 2, a circulating blower 3, an adsorption/desorption tower 4, a cooling source 5, a heating source 6, a water flow ejector 7 which is an ozone desorbing means, switch valves 8a to 8g, a tank 9, which is an oxygen gas supply means for supplying oxygen gas to the adsorption/desorption tower for storing ozone, and an adjuster 10 which is an oxygen gas flow rate adjusting means for adjusting an amount of oxygen gas supplied from the oxygen gas supply tank 9 to the adsorption/desorption tower 4. The adsorption/desorption tower 4 is of double cylinder type wherein an inner cylinder is filled with an adsorbent and an outer cylinder is filled with a thermal medium. It is preferable to select an adsorbent having a low decomposing rate when it comes into contact with ozone. For example, silica gel, activated alumina or porous materials impregnated with fluorocarbon can be employed. On the other hand, ethylene glycol or an alcohol group might be used as the thermal medium It should be noted that the circulating blower 3, ozone generator 1 and adsorption/desorption tower 4 constitute, in this order, a single circulating system.

Operations of the apparatus will now be explained. There are two operations in total, namely ozone adsorbing operation, and ozone desorbing operation.

The adsorbing operation will first be explained. Oxygen is supplied by the oxygen supply source 2 so that the pressure in the circulating system is always constant, for example 1.5 $kg/cm^2$. When oxygen is made to flow in the circulating system by the circulating blower 3 while the switch valves 8a to 8d are in an opened condition, a part of the oxygen is converted into ozone through silent discharge to generate an ozonized oxygen while passing through the discharge space of the ozone generator 1, and the ozonized oxygen is then transferred to the adsorption/desorption tower 4. The adsorbent in the adsorption/desorption tower 4 selectively adsorbs ozone, and the remaining oxygen is returned to the circulating blower 3 through the switch valve 8c. Oxygen which has been consumed as ozone is supplemented through the oxygen supply source 2. Since the adsorbent assumes a property that adsorption capacity of ozone increases if the adsorbent is cooled more, the cooling temperature is generally maintained by the cooling source 5 to not more than −40° C. Further, the higher the pressure in the circulating system becomes, the more efficiently ozone can be stored. However, in view of ozone generating efficiency and ozone storing efficiency, an excessive increase of pressure in the circulating system results in an increase in consumption of electricity at the time of storage so that it is desirable to maintain a pressure of about 5 kg/cm$^2$G maximum.

When the adsorbent in the adsorption/desorption tower 4 has adsorbed ozone to approach the ozone saturation adsorption amount, the desorbing operation of ozone is performed. In the desorbing operation, operations of the ozone generator 1, circulating blower 3 and cooling source 5 are terminated and the switch valves 8a to 8d are closed. Thereafter, the water flow ejector 7 starts its operation and the switch valve 8f is opened. At this time, temperature of the adsorbent is raised by applying heat of not less than 10° C. through the heating source 6 so that ozone which has been adsorbed by the adsorbent can easily be desorbed therefrom in a few minutes.

Simultaneously, oxygen gas is supplied from the oxygen gas supply tank 9 to the adsorption/desorption tower 4 via the oxygen gas flow rate adjuster 10. Thus, supplied oxygen is adsorbed on the surface of silica gel which serves as an adsorbent in the adsorption/desorption tower 4 so that a so-called gas substitution phenomenon occurs in which the supplied oxygen is adsorbed and in turn already adsorbed ozone is desorbed, and gas containing ozone of high density is aspirated by the water flow ejector 7. This condition is maintained for a specified time which is approximately 5 minutes in the case where slime adhesion is performed, and thereafter, the switch valves 8e, 8g are closed, oxygen supply from the oxygen gas supply tank 9 is terminated and operation of the water flow ejector 7 is terminated. Upon completion of the desorption period in this manner, the process returns to the initial adsorbing operation and is continuously repeated. It should be noted that the desorption operation might be started when ozone of a preset density has started to flow out from the adsorption/desorption tower 4. Alternatively, the adsorption time might be preliminary set so that the desorption process would be started following a time lapse.

Oxygen gas to be supplied at the time of ozone desorption is supplied from a position on a side opposite to the side from which ozone is aspirated from the adsorption/desorption tower 4. That is, when ozone is aspirated from the bottom portion of the adsorption/desorption tower 4, oxygen gas is supplied from the top portion of the adsorption/desorption tower 4. With this arrangement, substitution of oxygen and ozone can be efficiently performed and ozone of high density can be supplied. Although the amount of oxygen supply at the time of desorption depends on the amount of filled adsorbent, it is possible to supply ozone gas of highest density by adjusting the oxygen gas supply amount by the oxygen gas flow rate adjuster 10 such that oxygen is completely substituted by ozone at the outlet of the adsorption/desorption tower 4. In other words, by adjusting the amount of oxygen gas supply, an arbitrary amount of ozone of an arbitrary density can be input within a specified period to perform efficient ozone injection.

By the above-described arrangement, slime adhesion can be effectively prevented since high density ozone can be injected in a pulse-like manner, and it can also be prevented that ozone of low density having no influence upon prevention of slime adhesion is injected whereby useless consumption of ozone can be decreased. Further, ozone of high density can be injected also by omitting a temperature raising process of the adsorbent to eliminate the provision of a heating source and to decrease the amount of energy used for raising the temperature, whereby an economical ozone producing apparatus can be obtained.

It should be noted that this embodiment has been explained by taking a case of a desorption terminating flow in which the switch valve 8f is closed, oxygen supply from the oxygen gas supply tank 9 is terminated, and operation of the water flow ejector 7 is terminated; however, water used for driving the water flow ejector 7 can also be prevented from invading into the adsorption/desorption tower 4 by employing a desorption terminating flow in which oxygen supply from the oxygen gas supply tank 9 is terminated, the switch valve 8f is closed, and operation of the water flow ejector 7 is terminated.

Although temperature of the oxygen gas supplied at the time of ozone desorption has not been discussed in the present embodiment, in view of decreasing the amount of electricity required for cooling the ozone adsorbent again, it is preferable to set the temperature of oxygen gas to the same level as the temperature of the cooled ozone adsorbent. However, in view of the capability of desorbing stored ozone at a stroke to be of high density, it is preferable to supply oxygen gas having a temperature higher than that of the ozone adsorbent. That is, by supplying oxygen gas having a temperature which has not been controlled and thus being of room temperature level, ozone can be effectively desorbed.

Embodiment 2

Figure 2:
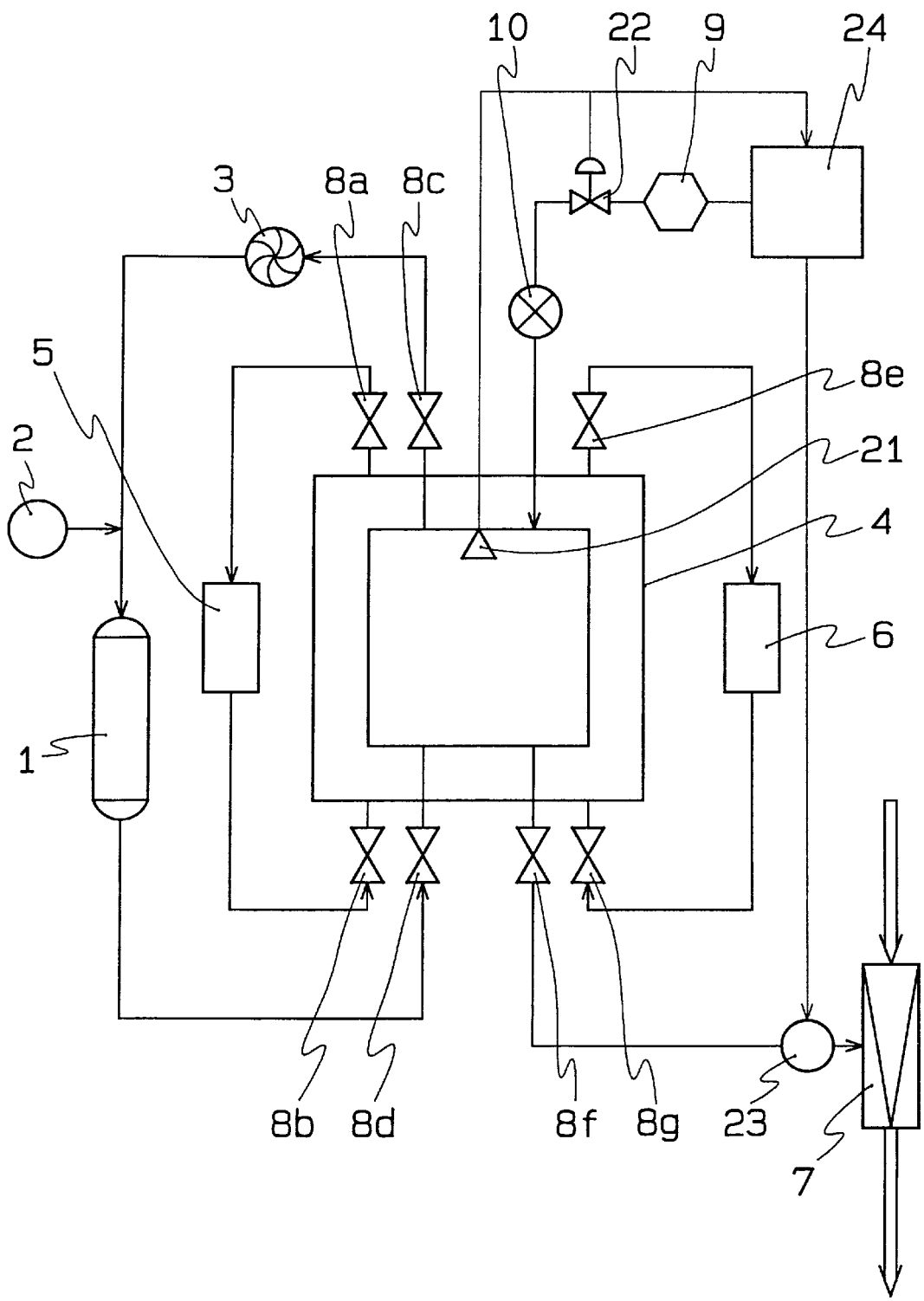
FIG. 2 is a diagram showing an arrangement of an ozone producing apparatus according to Embodiment 2 of the present invention.

FIG. 2 is a diagram showing an arrangement of an ozone producing apparatus according to Embodiment 2 of the present invention. Numerals of FIG. 2 which are identical with those of Embodiment 1 indicate identical or equivalent portions, and explanations thereof will thus be omitted.

The apparatus according to this embodiment includes a pressure sensor 21 for measuring a pressure in the adsorption/desorption tower 4 which is a gas control means, a pressure adjuster 22 for adjusting a supplying pressure of oxygen gas which is supplied from the oxygen gas supply tank 9 to the adsorption/desorption tower 4, a flow rate controller 23 for adjusting an ozone gas flow rate which is aspirated by the water flow ejector 7, and a pressure controller 24 for controlling, upon receipt of a signal from the pressure sensor 21, operations of the pressure adjuster 22, flow rate controller 23 and oxygen gas flow rate adjuster 10.

Operations will now be explained. There are two operations, namely ozone adsorbing operations and ozone desorbing operations. Since the ozone adsorbing operations are identical with those of Embodiment 1, explanations thereof will be omitted here.

When the adsorbent in the adsorption/desorption tower 4 has adsorbed ozone to approach the ozone saturation adsorption amount, the desorbing operation is performed. In the desorbing operation, operations of the ozone generator 1, the circulating blower 3 and the cooling source 5 are terminated and the switch valves 8a to 8d are closed. Thereafter, the water flow ejector 7 starts its operation and switch valves 8e to 8g are operated. At this time, temperature of the adsorbent is raised by applying heat of not less than 10° C. through the heating source 6 so that ozone which has been adsorbed by the adsorbent can easily be desorbed therefrom in a few minutes. Simultaneously, oxygen gas is supplied from the oxygen gas supply tank 9 to the adsorption/desorption tower 4 via the oxygen gas flow rate adjuster 10. Ozone injection is performed for a specified time, and when the process is completed, the switch valve 8f is closed, the oxygen supply from the oxygen gas supply tank 9 is terminated and the operation of the water flow ejector 7 is terminated. When the desorbing period is completed in this manner, the process returns to the initial adsorbing operation and is continuously repeated.

At the time of ozone desorption, the amount of ozone which is again adsorbed after being desorbed by substitution with oxygen can be further decreased when the pressure in the adsorption/desorption tower 4 is lowered. That is, the amount of re-adsorbed ozone can be decreased by making the pressure in the adsorption/desorption tower 4 to less than the atmospheric pressure and thus to be in a negative pressure state. For this purpose, the pressure controller 24 controls operations of the pressure adjuster 22, flow rate controller 23 and oxygen gas flow rate adjuster 10 upon receipt of an electric signal from the pressure sensor 21 such that the pressure in the adsorption/desorption tower 4 is decreased as much as possible while maintaining a constant amount of oxygen gas supply to the adsorption/desorption tower 4. That is, ozone can be efficiently desorbed by decreasing the pressure of the supplied oxygen gas by means of the pressure adjuster 22 and by making the amount of supplied oxygen gas smaller than the amount of desorbed ozone gas.

By decreasing the pressure of the supplied oxygen gas by means of the pressure adjuster 22 and by making the amount of supplied oxygen gas smaller than the amount of desorbed ozone gas, it has been enabled in the apparatus of this embodiment to make the pressure in the adsorption/desorption tower 4 at the time of desorbing ozone to less than the atmospheric pressure and to decrease the amount of re-adsorbed ozone, whereby ozone of high density can be injected in a pulse-like manner for a specified period and slime adhesion can be effectively prevented. Further, the amount of oxygen gas used for the desorption can be decreased to perform economical ozone injection Although the place of installation of the pressure sensor 21 has not been mentioned in this embodiment, it is preferable that the pressure sensor 21 is disposed at a position which is remotest from a position at which ozone is aspirated by the water flow ejector 7. With this arrangement, all of the adsorbent in the adsorption/desorption tower 4 can be maintained at a pressure which is less than the atmospheric pressure, whereby ozone can be efficiently desorbed. Equivalent effects can be obtained by disposing the pressure sensor 21 in a downstream side of the oxygen gas flow rate adjuster 10. Further, a plurality of pressure sensors 21 might be used to perform precise control.

Embodiment 3

Figure 3:
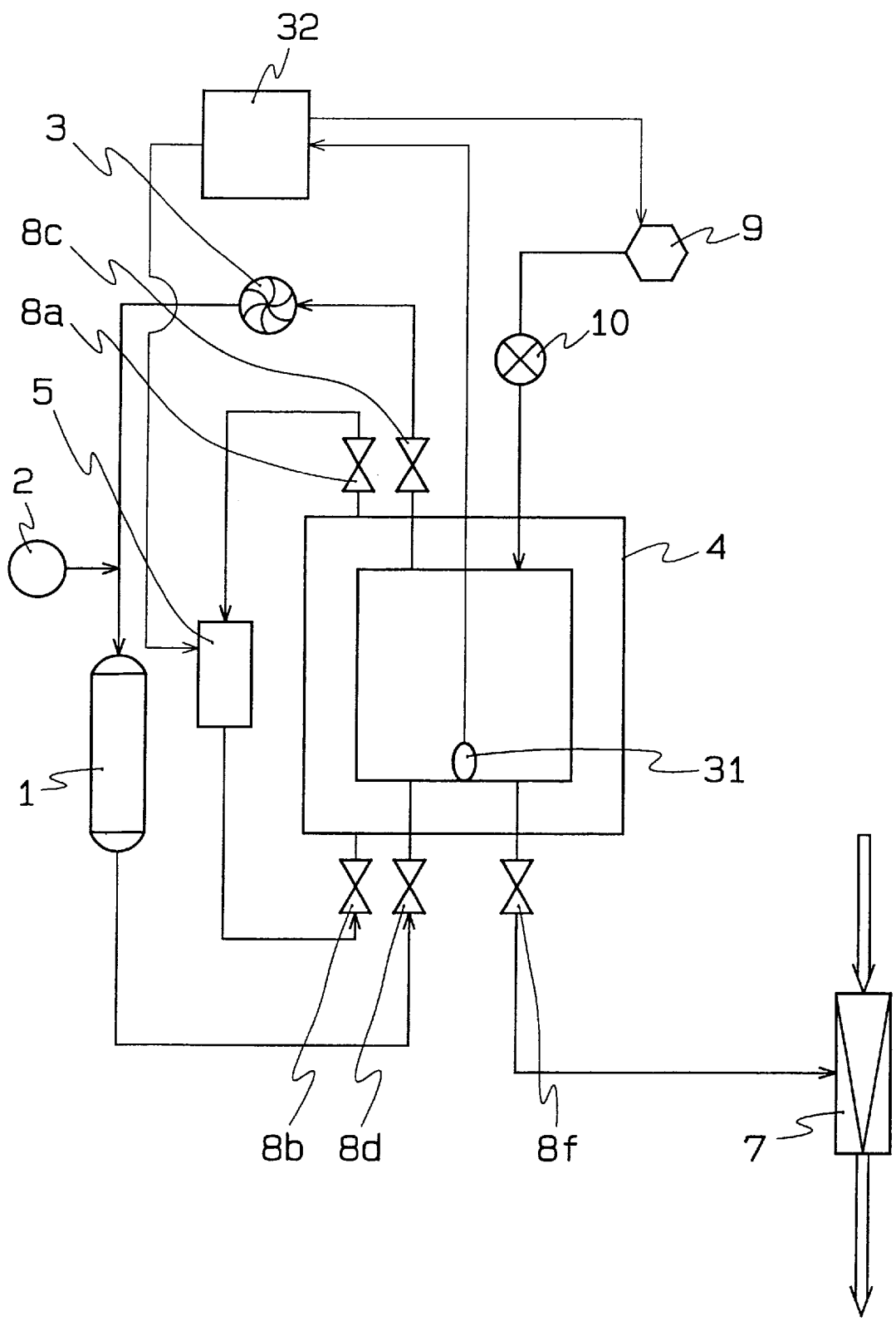
FIG. 3 is a diagram showing an arrangement of an ozone producing apparatus according to Embodiment 3 of the present invention.

FIG. 3 is a diagram showing an arrangement of an ozone producing apparatus according to Embodiment 3 of the present invention. Numerals of FIG. 3 which are identical with those of Embodiment 1 indicate identical or equivalent portions, and explanations thereof will thus be omitted.

The apparatus according to this embodiment includes a temperature control means comprising a temperature sensor 31 for measuring a temperature in the adsorption/desorption tower 4 and a temperature controller 32 for controlling operations of the cooling source 5 upon receipt of a signal from the temperature sensor 31.

Operations will now be explained. There are two operations, namely ozone adsorbing operations and ozone desorbing operations. Since the ozone adsorbing operations are identical with those of Embodiment 1, explanations thereof will be omitted.

When the adsorbent in the adsorption/desorption tower 4 has adsorbed ozone to approach the ozone saturation adsorption amount, the desorbing operation is performed. In the desorbing operation, operations of the ozone generator 1 and circulating blower 3 are terminated, and switch valves 8a to 8d are closed. Thereafter, the water flow ejector 7 starts its operation and the switch valve 8f is opened. At this time, oxygen gas is supplied from the oxygen gas supply tank 9 to the adsorption/desorption tower 4 via the oxygen gas flow rate adjuster 10. Ozone injection is performed for a specified time, and when the process is completed, the switch valve 8f is closed, oxygen supply from the oxygen gas supply tank 9 is terminated and operation of the water flow ejector 7 is terminated. When the desorbing period is completed in this manner, the process returns to the initial adsorbing operation and is continuously repeated.

At the time of ozone desorption, the temperature of silica gel which is employed as the ozone adsorbent drops once, since an endothermic amount by desorption of ozone becomes larger than an exothermic amount by adsorption of ozone. However, the temperature of silica gel is raised again by heat released from the adsorption/desorption tower 4. In this way, the temperature varies in the desorbing process depending on the adsorption of oxygen, desorption of ozone and heat released from the adsorption/desorption tower. Therefore, the electric signal is sent from the temperature sensor 31 to the temperature controller 32 and an operation or termination signal is sent from the temperature controller 32 to the cooling source 5 in order to maintain the temperature in the adsorption/desorption tower 4 at the temperature at the time of adsorption and storage. That is, the cooling source 5 repeats operation or termination thereof in this embodiment to bring the temperature in the adsorption/desorption tower 4 to the temperature at the time of adsorption and storage, regardless whether an adsorbing process or a desorbing process is performed.

Since the temperature of the adsorption/desorption tower is not raised at the time of desorption and desorption is performed at the same temperature as that at the time of adsorption, the amount of energy required for heating or cooling can be decreased, and since the temperature in the adsorption/desorption tower 4 is delicately controlled by employing the temperature sensor 31, the amount of energy required for driving the cooling source 5 can be decreased, which results in a decrease of running costs.

Although the place of installation of the temperature sensor 31 has not been mentioned in this embodiment, it is preferable that the temperature sensor 31 is disposed at a position which is closest to a position from which ozonized oxygen is supplied at the time of adsorbing ozone. With this arrangement, adsorption of ozone can be effectively performed. Further, a plurality of temperature sensors 31 might be used to perform precise control.

As already mentioned in Embodiment 1, in view of the capability of desorbing stored ozone at a stroke to be of high density, it is preferable to supply oxygen gas having a temperature higher than that of the ozone adsorbent. That is, by supplying oxygen gas having a temperature which has not been controlled and thus being of room temperature level, ozone can be efficiently desorbed. It is also possible to desorbed ozone in an initial stage of desorption with oxygen gas of which the temperature is not controlled, and to supply oxygen gas cooled to a level of temperature of the adsorbent when temperature of the adsorbent which has once dropped has again reached the temperature at the time of adsorption With this arrangement, heat quantity which is taken from the adsorption/desorption tower 4 at the time of ozone desorption can be limited to a minimum and efficient ozone desorption can be achieved. Further, while the present embodiment has been explained by taking a case in which no heating source is provided, it is also possible to provide for a heating source which might be used together with the cooling source to maintain the temperature of the adsorption/desorption tower the desorption process to that of the adsorbing and storing process.

Embodiment 4

Figure 4:
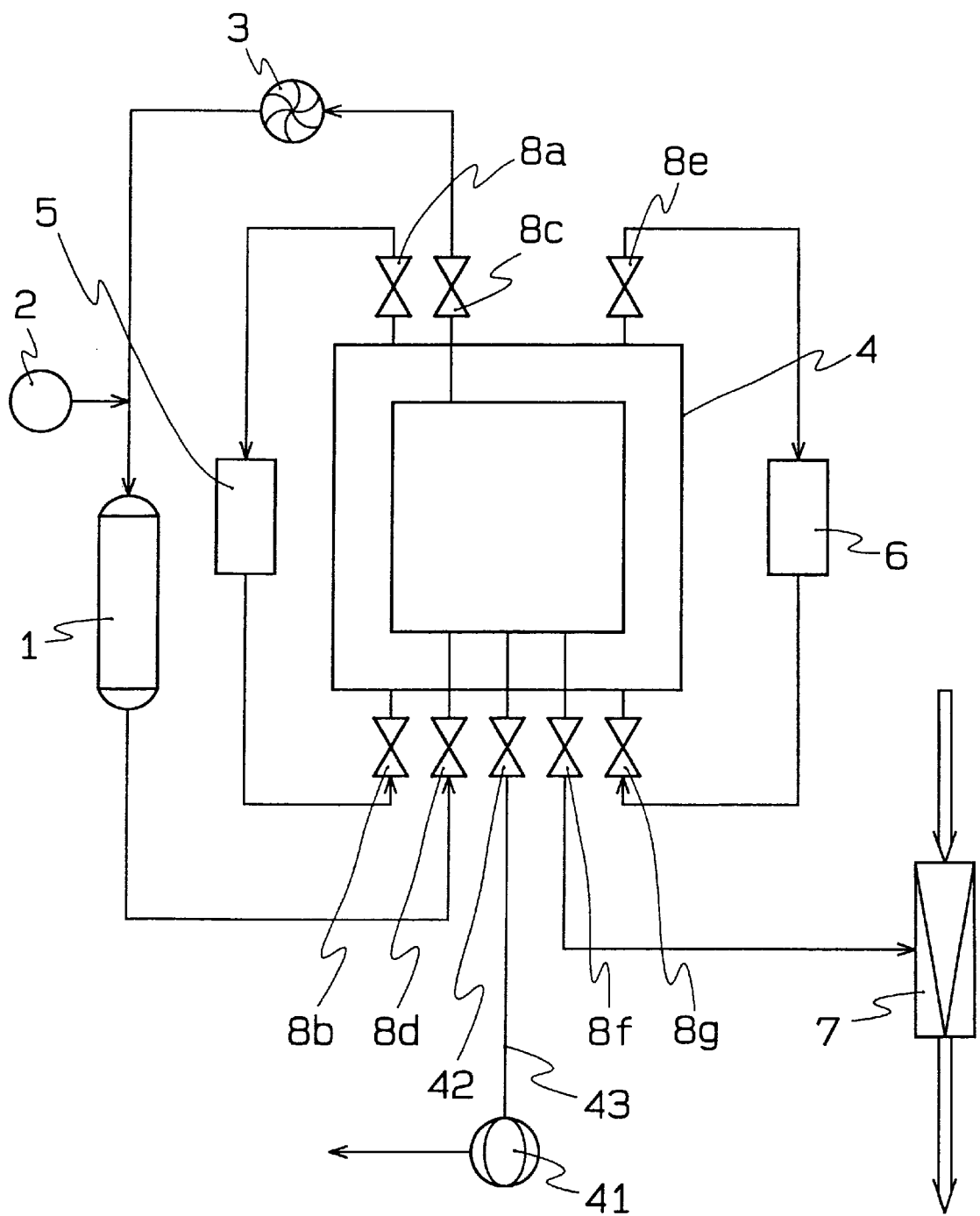
FIG. 4 is a diagram showing an arrangement of an ozone producing apparatus according to Embodiment 4 of the present invention.

FIG. 4 is a diagram showing an arrangement of an ozone producing apparatus according to Embodiment 4 of the present invention. Numerals of FIG. 4 which are identical with those of Embodiment 1 indicate identical or equivalent portions, and explanations thereof will thus be omitted.

The apparatus according to this embodiment includes an exhausting device 41 as an exhausting means for performing exhaustion in the adsorption/desorption tower 4 and a stop valve 42 provided on a piping 43 which connects the adsorption/desorption tower 4 and the exhausting device 41.

Operations will now be explained. Since ozonized oxygen is still supplied from the ozone generator 1 to the adsorption/desorption tower 4 immediately after adsorbing process has been completed, and oxygen gas remaining after ozone has been adsorbed by the adsorbent resides in the adsorption/desorption tower 4, even if ozone of high density can be desorbed and separated from silica gel, it is diluted by the residual oxygen gas, so that the density of desorbed ozone can not be made definite (that is, taking ozone of high density from the adsorption/desorption tower 4 in a short time).

In this embodiment, the exhausting device 41 is immediately operated for a specified time after completion of the desorbing process, and the stop valve 42 is opened to exhaust oxygen gas remaining in the adsorption/desorption tower 4. Then, after operating the heating source 6 to raise temperature of the adsorbent or operating the water flow ejector 7, the adsorption/desorption tower 4 is decompressed to desorbed the adsorbed ozone. Alternatively, the water flow ejector 7 might be operated after the temperature of the adsorbent has been raised to perform adsorption.

In this manner, the desorbed ozone density can be made high and can also be made definite, since oxygen gas in the adsorption/desorption tower 4 can be preliminary exhausted by operating the exhausting device 41 immediately before starting desorption.

It is also effective to send a small amount of oxygen to the adsorption/desorption tower 4 after exhausting through the exhausting device 41. That is, by operating either or both of the switch valves 8c and 8d, a small amount of oxygen is supplied to the adsorption/desorption tower 4 from the oxygen supply source 2.

From among ozonized oxygen which has been supplied to the adsorption/desorption tower 4 at the last of the adsorbing process, oxygen which has not been adsorbed is preliminary exhausted by the exhausting device 41 so that ozone which has been adsorbed is desorbed in the adsorption/desorption tower 4. Mixing a small amount of oxygen thereto causes mingling of oxygen to a prevailing ozone atmosphere and thus disturbs adsorption equilibrium of ozone with respect to the adsorbent, and the desorbing speed of adsorbed ozone is increased.

In this embodiment, adsorbed ozone can be desorbed at one stroke by injecting a small amount of oxygen to the adsorption/desorption tower 4 after exhausting gas in the adsorption/desorption tower 4, whereby the density of desorbed ozone can be made high and can further be made definite.

While gas from the adsorption/desorption tower 4 is directly exhausted into air, an apparatus of even higher safety can be obtained when ozone is introduced to an ozone decomposing tower and is decomposed by means of a catalyst or the like before it is exhausted.

Embodiment 5

Figure 5:
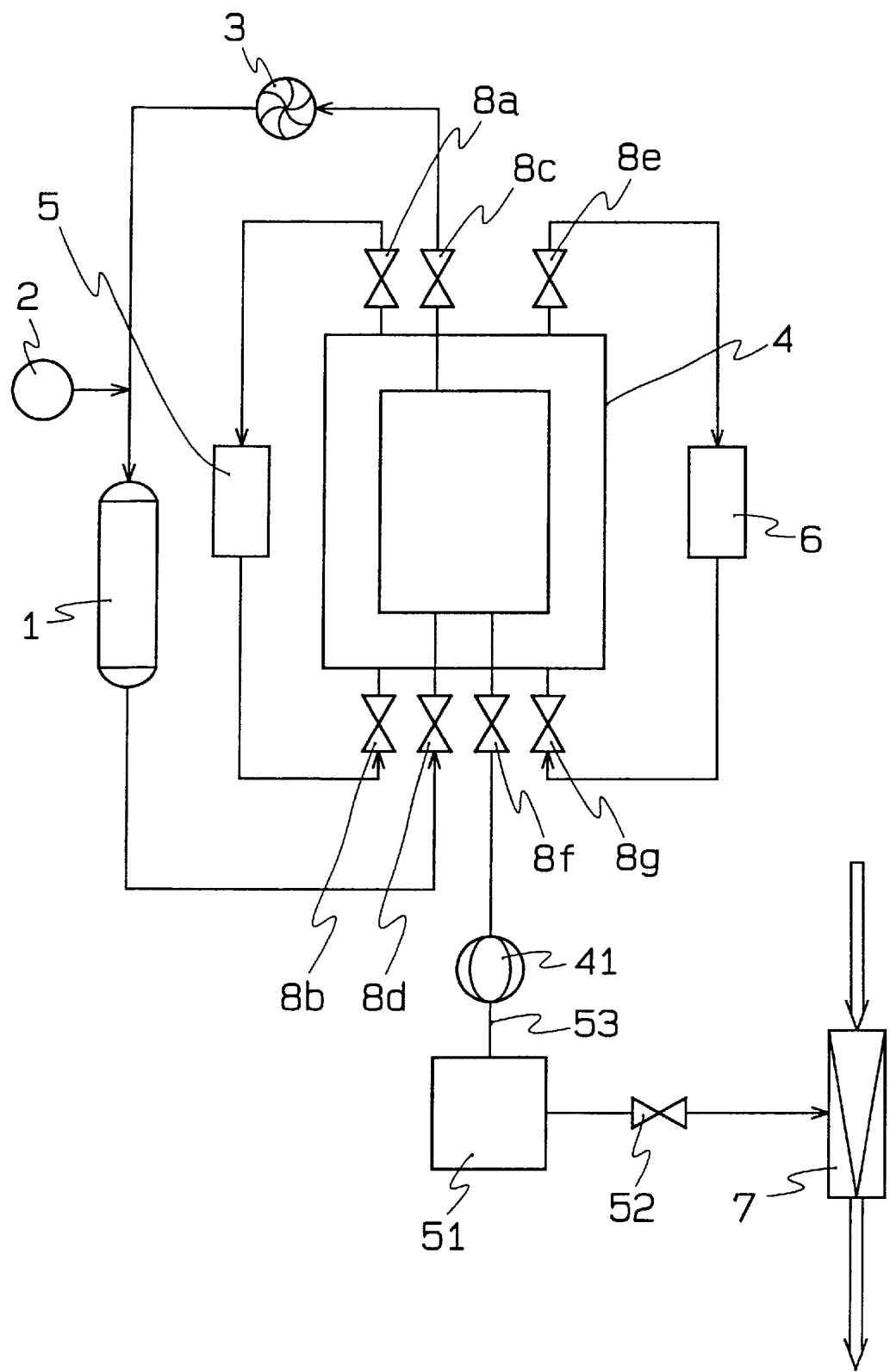
FIG. 5 is a diagram showing an arrangement of an ozone producing apparatus according to Embodiment 5 of the present invention.

FIG. 5 is a diagram showing an arrangement of an ozone producing apparatus according to Embodiment 5 of the present invention. Numerals of FIG. 5 that are identical with those of Embodiment 1 indicate identical or equivalent portions, and explanations thereof will thus be omitted.

Numeral 51 denotes a tank for temporarily storing gas exhausted from the exhausting device 41, and 52 a switch valve. These are provided to a piping 53 which connects the exhausting device 41, tank 51, switch valve 52, adsorption/desorption tower 4, switch valve 8f and the water flow ejector 7.

Operations will now be explained. When the adsorbing process is completed, ozone which has been adsorbed by the adsorbent is desorbed by heating the ozone adsorbent in the adsorption/desorption tower 4 by means of the heating source 6. At the initial stage of desorption, the desorbing speed is high and the density is also high, and with the time lapsing, both the desorbing speed and desorbed ozone density abruptly decrease. Therefore, the heating source 6 is operated when entering the desorption process, ozone which has been adsorbed and stored by the adsorbent is desorbed at a high density by raising the temperature of the adsorbent, the switch valve 8f is opened while the switch valve 52 remains closed, and the exhausting device 41 is operated to temporarily store ozone gas of high density in the tank 51 which has been desorbed and stored in the adsorption/desorption tower 4. Then, the switch valve 8f is also closed and the exhausting device 41 is terminated, whereupon the water flow ejector 7 is operated and the switch valve 52 is opened to introduce ozone which has been temporarily stored in the tank 51 to the water flow ejector 7 which is then dispersed into the water to dissolve as ozone water to be sent for use.

As explained so far, since the apparatus of this embodiment is so arranged that ozone of high density which is desorbed at the initial stage of the desorbing process is temporarily stored in the tank and ozone is supplied to the water flow ejector 7 after equalizing the desorbed ozone density, there can be achieved an effect that a low densification of ozone which presents small slime adhesion prevention effects in the latter half of the desorbing process as in a conventional apparatus can be eliminated.

While the present embodiment has been explained by taking a case in which an exhausting device 41 is provided and desorption is promoted by decompressing the adsorption/desorption tower 4, almost equivalent effects can be obtained by omitting the exhausting device 41, since ozone of high density can be desorbed by a simple operation of further raising temperature of the adsorbent in the adsorption/desorption tower 4 by the heating source 6.

Embodiment 6

Figure 6:
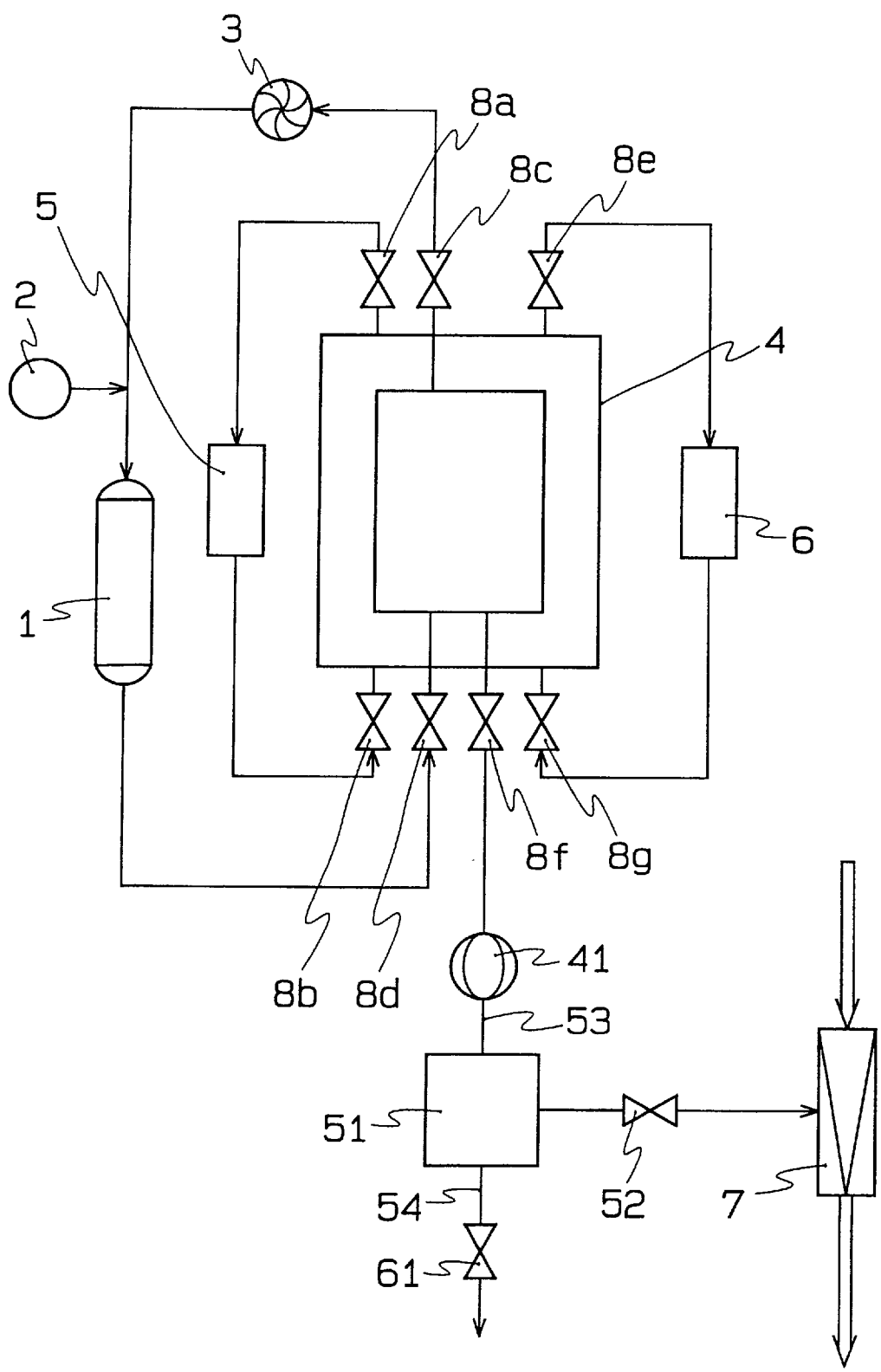
FIG. 6 is a diagram showing an arrangement of an ozone producing apparatus according to Embodiment 6 of the present invention.

FIG. 6 is a diagram showing an arrangement of an ozone producing apparatus according to Embodiment 6 of the present invention. In FIG. 6, numeral 61 denotes a switch valve attached to a piping 54 from a tank 51. The remaining arrangements are identical with those of the previous Embodiment 5.

Operations will now be explained. Ozonized oxygen is still supplied from the ozone generator 1 to the adsorption/desorption tower 4 immediately after the adsorbing process has been completed, and oxygen gas remaining after ozone has been adsorbed by the adsorbent resides in the adsorption/desorption tower 4. Therefore, immediately after completion of the desorbing process, switch valves 8f, 61 are opened and the exhausting device 41 is operated for a specified time to exhaust oxygen gas remaining in the adsorption/desorption tower 4. Thereafter, the switch valves 8f, 61 are closed and the exhausting device 41 is terminated. Then, the heating source 6 is operated to heat the adsorbent and ozone adsorbed by the adsorbent in the adsorption/desorption tower 4 is desorbed to be of high density. The switch valve 8f is then opened while switch valves 52, 61 remain closed, and the exhausting device 41 is operated to temporarily store ozone gas of high density in the tank 51 which has been desorbed and stored in the adsorption/desorption tower 4. Then, the switch valve 8f is also closed and the exhausting device 41 is terminated, whereupon the water flow ejector 7 is operated and the switch valve 52 is opened to introduce ozone which has been temporarily stored in the tank 51 to the water flow ejector 7 which is then dispersed into the water to dissolve as ozone water to be sent for use.

Since oxygen gas in the adsorption/desorption tower 4 is exhausted by driving the exhausting device 41 when starting the desorbing operation, the desorbed ozone density can be made high and made to be definite. Further, since ozone of high density which is desorbed at the initial stage of the desorbing process is temporarily stored in the tank and provided to the water flow ejector 7 after equalizing the desorbed ozone density, there can be achieved an effect that a low densification of ozone which presents small slime adhesion prevention effects in the latter half of the desorbing process as in a conventional apparatus can be eliminated.

While gas from the adsorption/desorption tower 4 is directly exhausted into air, an apparatus of even higher safety can be obtained when ozone is introduced to an ozone decomposing tower and is decomposed by means of a catalyst or the like before it is exhausted, similarly to Embodiment 4.

While the present embodiment has been explained by taking a case in which an exhausting device 41 is provided and desorption is promoted by decompressing the adsorption/desorption tower 4, almost equivalent effects can be obtained by omitting the exhausting device 41, since ozone of high density can be desorbed by a simple operation of further raising temperature of the adsorbent in the adsorption/desorption tower 4 by the heating source 6.

Embodiment 7

Figure 7:
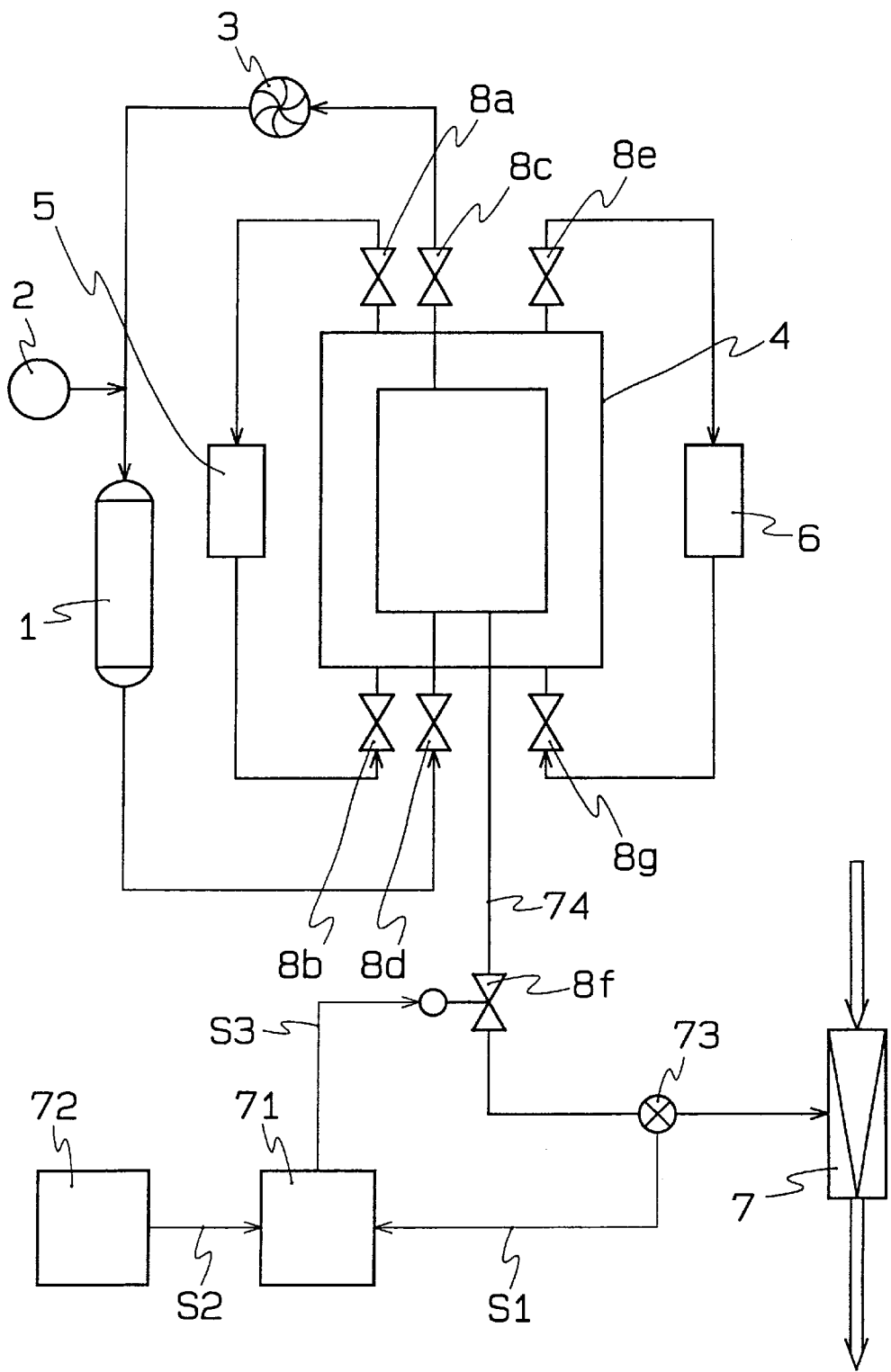
FIG. 7 is a diagram showing an arrangement of an ozone producing apparatus according to Embodiment 7 of the present invention.

FIG. 7 is a diagram showing an arrangement of an ozone producing apparatus according to Embodiment 7 of the present invention. In FIG. 7, numeral 71 denotes a control circuit, 72 a setting means, and 73 an ozone densitometer attached to a piping 74. S1, S2 and S3 indicate signal lines which respectively connect the ozone densitometer 73 with the control circuit 71, the setting means 72 with the control circuit 71, and the switch valve 8f with the control circuit 71.

Figure 8:
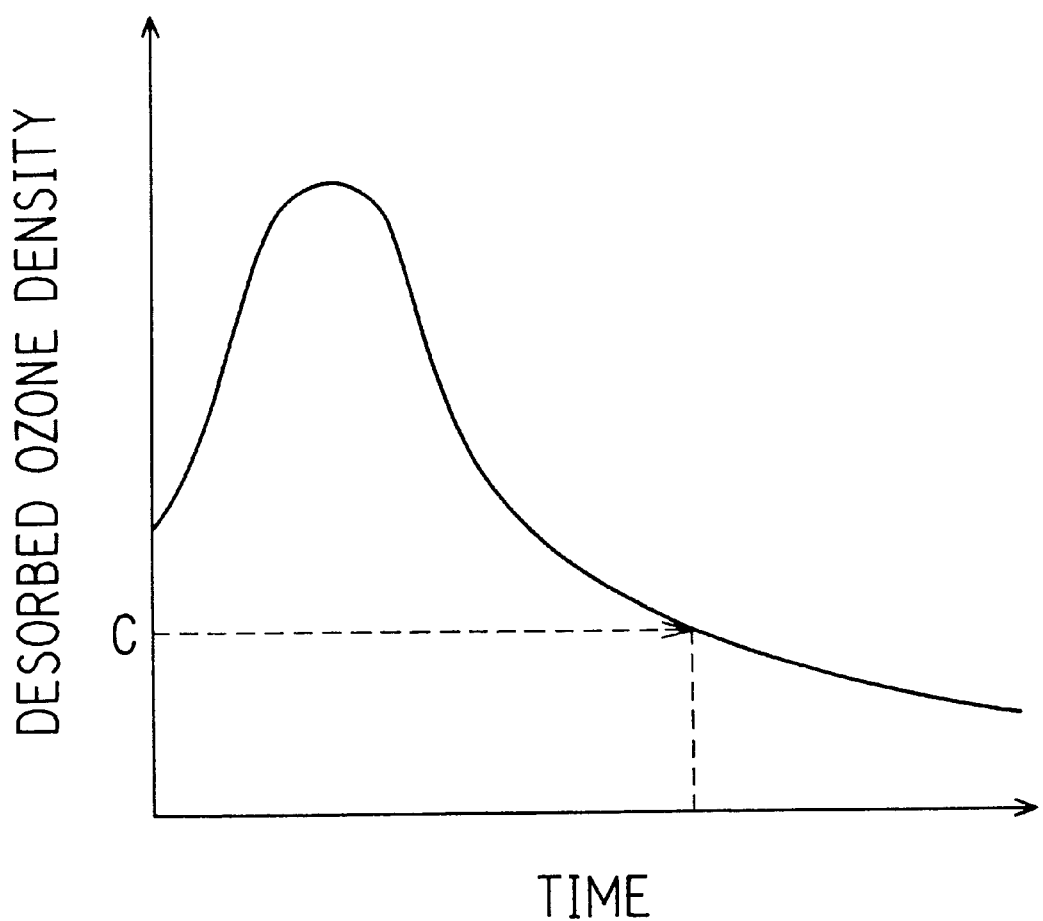
FIG. 8 is a qualitative diagram showing change of desorbed ozone density with the passage of time.

Operations will now be explained. FIG. 8 shows time changes in the density of desorbed ozone in a conventional apparatus. As shown in FIG. 8, the desorbed ozone density assumes a pattern that it abruptly increases to reach a maximum density after starting the desorption and decreases thereafter. As already explained, it is important to perform treatment with ozone of high density in a short time for preventing slime adhesion, in other words, the maximum peak density of desorbed ozone is important. Thus, though favorable treatment can be performed in a time zone in the initial stage of the desorbing process wherein the desorbed ozone density is high, ozone of low density which presents small effects in preventing slime adhesion is desorbed in the latter half of the time zone whereby the effects of treatment are made small and uneconomical, and still worse, it might cause generation of oxidants which badly affect marine products when applied to sea water. That is, when desorption is terminated at a point where the desorbed ozone density decreases, after reaching a maximum peak, to a density which has been preliminary set as a density with which effective treatment can be performed, that is, at which the desorbed ozone density decreases to point C, an economic and effective treatment without generating any oxidants can be performed.

In this embodiment, as shown in FIG. 7, the desorbed ozone density is measured with the ozone densitometer 73 and a corresponding signal is sent to the control circuit 71 via the signal line S1. The control circuit 71 then performs a comparison between the measured value and a set value which has been set by the setting means 72 and is supplied to the control circuit 71 via the signal line S2, and after the measured value for the desorbed ozone density has reached the maximum peak and decreases to the set density, a signal is sent to the switch valve 8f via the signal line S3 to close the switch valve 8f.

In this embodiment, since an ozone densitometer for measuring the desorbed ozone gas density to obtain the ozone gas density at the time of desorption, and desorption is terminated by sending a desorption terminating signal from the control circuit when the measured value for the desorbed ozone has dropped to a preliminary set value while gradually decreasing in density after the desorbed ozone density has reached the maximum peak, low densification of ozone which presents small slime adhesion prevention effects in the latter half of the desorbing process as in a conventional apparatus can be eliminated. Thus, there can be achieved effects that the desorbed ozone density is maintained high, and that the apparatus is economical and presents great processing performance, and is also capable of eliminating generation of oxidants even when applied to sea water.

Embodiment 8

Figure 9:
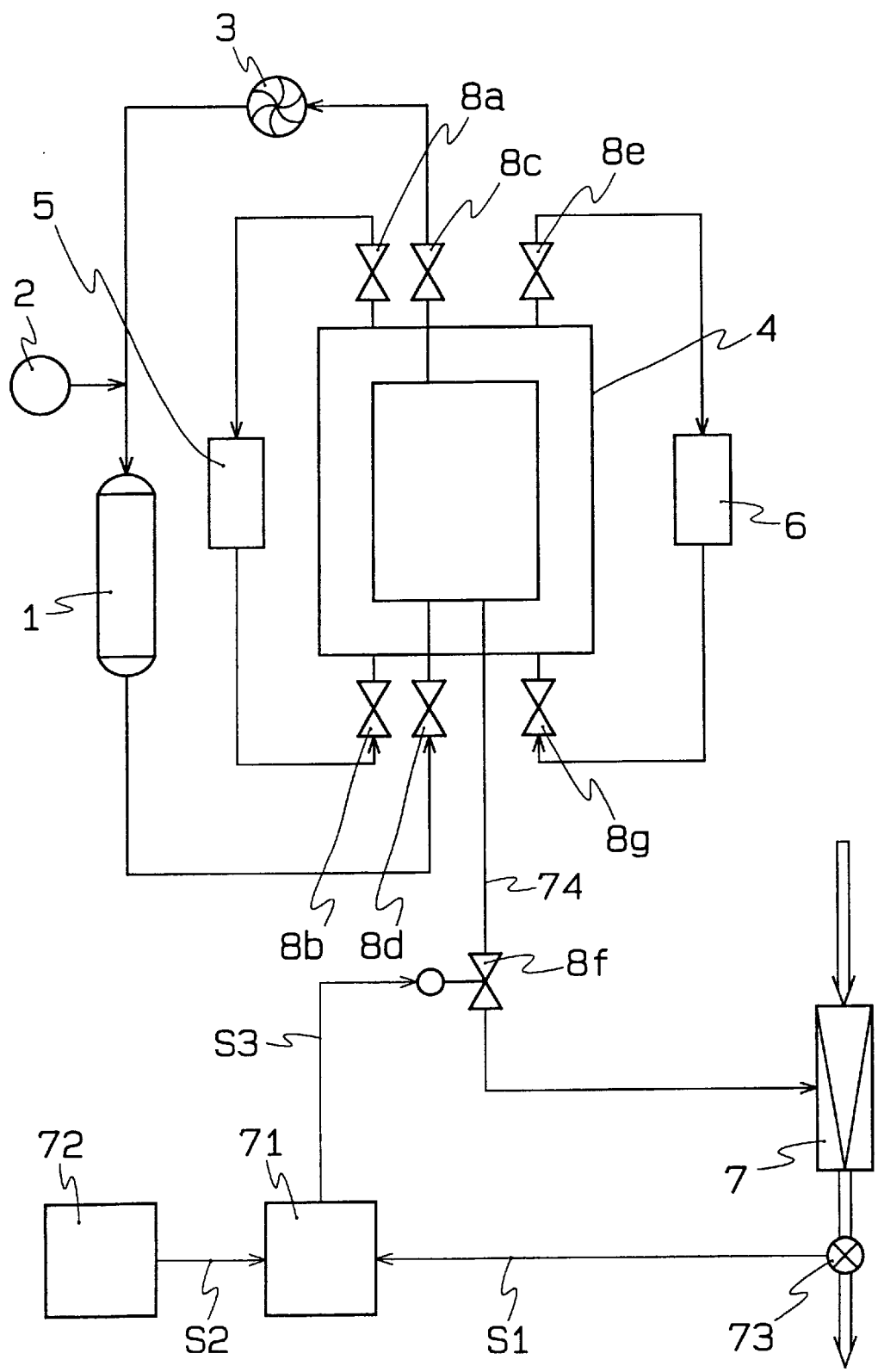
FIG. 9 is a diagram showing an arrangement of an ozone producing apparatus according to Embodiment 8 of the present invention.
Figure 10:
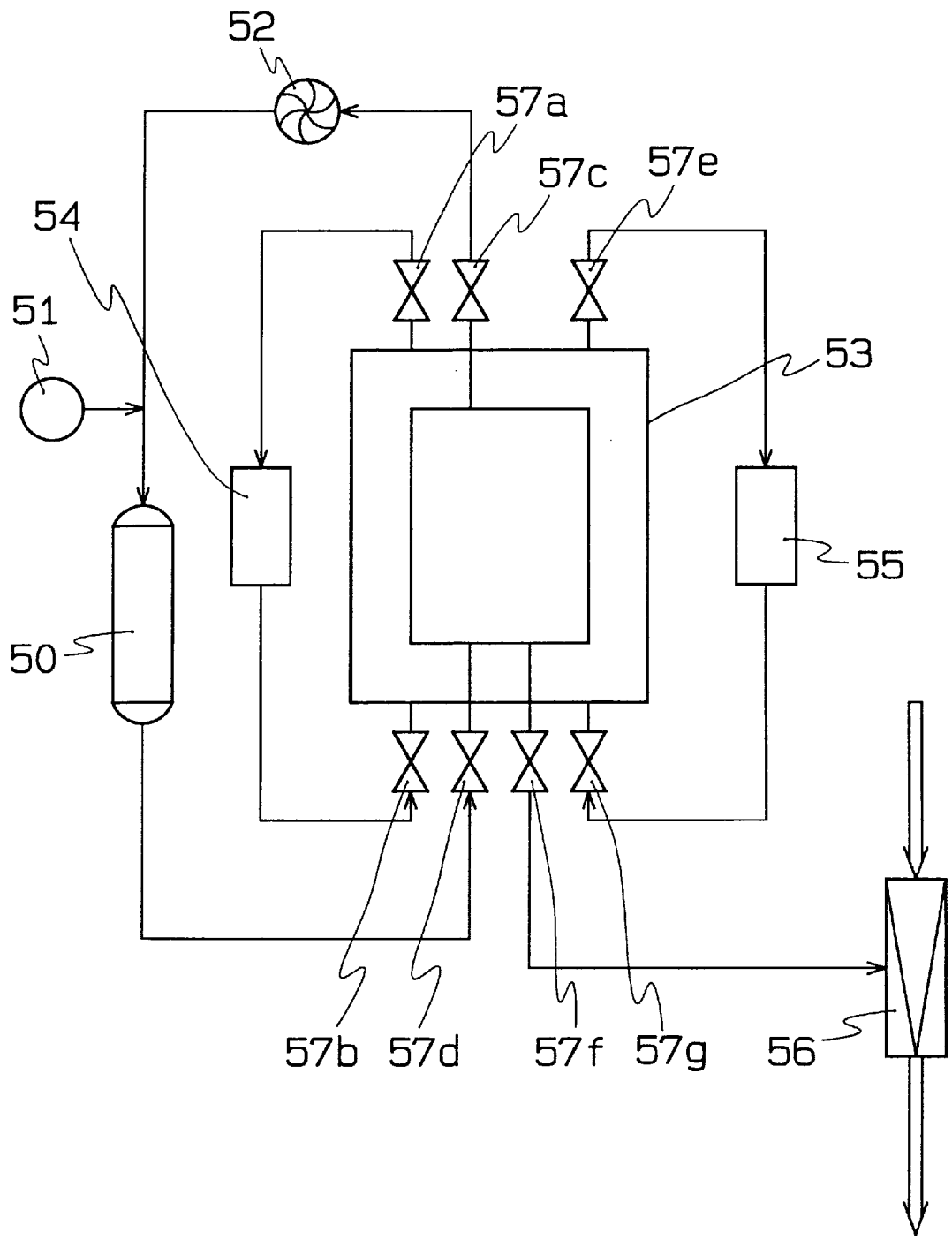
FIG. 10 is a diagram showing an arrangement of a conventional ozone producing apparatus.

FIG. 9 is a diagram showing an arrangement of an ozone producing apparatus according to Embodiment 8 of the present invention. In FIG. 9, an ozone densitometer 73 is disposed at a preliminary set location in the downstream side of a water flow ejector 7, and a signal line S1 connects the ozone densitometer 73 with a control circuit 71. The remaining arrangements are identical with those of Embodiment 7.

Operations will now be explained. Operations of the apparatus of FIG. 9 are almost identical with those of the previous Embodiment 7. That is, the desorbed ozone density is measured by the ozone densitometer 73 as a density of ozone which is dissolved in water at a preliminary set location in the downstream of the water flow ejector 7, and a corresponding signal is supplied to the control circuit 71 via the signal line S1. The control circuit 71 then performs a comparison between the measured value and a set value which has been set by the setting means 72 and supplied to the control circuit 71 via the signal line S2, and after the measured value for the desorbed ozone density has reached the maximum peak and decreases to the set density, a signal is sent to the switch valve 8f via the signal line S3 to close the switch valve 8f.

In this embodiment, low densification of ozone which presents small slime adhesion prevention effects in the latter half of the desorbing process as in a conventional apparatus can be eliminated, similarly to the previous Embodiment 7, and there can be achieved effects that the desorbed ozone density is maintained high, and that the apparatus is economical and presents great processing performance, and is also capable of eliminating generation of oxidants even when applied to sea water.

Further, since the speed of multiplication of microorganism and seaweed in the water which cause slime hazards varies depending on the water temperature or on the degree of pollution of the water, and the reactive speed of ozone also varies, the amount of required ozone also varies with seasonal fluctuations in water temperature or degree of pollution of the water. In this embodiment, since desorbed ozone is controlled by measuring the density of ozone dissolved in water, economical and efficient treatments can be performed with just sufficiently enough ozone even when environmental conditions of applied water or the like change.

The ozone producing apparatus according to the first invention is so arranged as to aspirate ozone by means of the water flow ejector which is the ozone desorbing means and to simultaneously send oxygen gas from the oxygen gas supply means into the adsorption/desorption tower while adjusting the flow rate thereof, whereby there can be achieved effects that ozone injection can be made definite, that the apparatus is economical in the aspect of both initial and running costs, and that it presents great effects of preventing slime adhesion and can also limit generation of oxidants even when applied to sea water.

The ozone producing apparatus according to the second invention is so arranged as to make pressure of oxygen gas supplied to the adsorption/desorption tower at the start of the desorbing process as small as possible and to make the amount of ozone aspirated by the water flow ejector which is the ozone desorbing means as large as possible, whereby there can be achieved effects that ozone can be effectively desorbed, that the apparatus is economical in the aspect of both initial and running costs, and that it presents great effects of preventing slime adhesion and can also limit generation of oxidants even when applied to sea water.

The ozone producing apparatus according to the third invention is so arranged as to include a temperature control means for maintaining temperature in the adsorption/desorption tower at the time of desorption to the temperature at the time of adsorption and storage, whereby there can be achieved effects that the amount of required energy can be decreased, ozone injection can be performed as definite as possible, that the apparatus is economical in the aspect of both initial and running costs, and that it presents great effects of preventing slime adhesion and can also limit generation of oxidants even when applied to sea water.

The ozone manufacturing apparatus according to the fourth invention is so arranged as to firstly exhaust gas in the adsorption/desorption tower at the beginning of the desorption process and to make the temperature of the adsorbent rise or to decompress the interior of the adsorption/desorption tower before desorbing the adsorbed ozone, whereby there can be achieved effects that oxygen gas remaining in the adsorption/desorption tower after completion of the adsorbing process can be preliminary eliminated, that the ozone density can be made definite, that the apparatus is economical in the aspect of both initial and running costs, and that it presents great effects of preventing slime adhesion and can also limit generation of oxidants even when applied to sea water.

The ozone producing apparatus according to the fifth invention is so arranged as to inject a small amount of oxygen into the adsorption/desorption tower after exhausting gas in the adsorption/desorption tower, whereby there can be achieved effects that adsorbed ozone can be desorbed at a stroke, that the ozone density can be made definite, that the apparatus is economical in the aspect of both initial and running costs, and that it presents great effects of preventing slime adhesion and can also limit generation of oxidants even when applied to sea water.

The ozone producing apparatus according to the sixth invention is so arranged as to temporarily store desorbed ozone in the tank for equalizing the desorbed ozone density, there can be achieved effects that low densification of desorbed ozone which presents small effects for preventing slime adhesion that used to occur in the latter half of the desorbing process in a conventional apparatus is eliminated, and that the apparatus is economical in the aspect of both initial and running costs and can also limit generation of oxidants even when applied to sea water.

The ozone producing apparatus according to the seventh invention is so arranged as to include an ozone densitometer for measuring density of desorbed ozone wherein while measuring the ozone density during desorption, a desorption terminating control signal is sent from the control circuit for terminating the desorption when the measured value of the ozone density at the time of desorption has fallen to a predetermined value after having reached a maximum value, there can be achieved effects that low densification of desorbed ozone which presents small effects for preventing slime adhesion that used to occur in the latter half of the desorbing process in a conventional apparatus is eliminated, and that the apparatus is economical in the aspect of both initial and running costs and can also limit generation of oxidants even when applied to sea water.

What is claimed is:

1. An ozone-producing apparatus including:
    an adsorption/desorption tower having an inner cylinder filled with an ozone absorbent and surrounded by an outer cylinder filled with a heating medium;
    a generator configured to supply ozone to the inner cylinder of the tower through a first switch valve connected to one end of the inner cylinder of the tower;
    a blower configured to circulate oxygen through a second switch valve from the inner cylinder of the tower to the generator;
    a cooling source configured to supply a cooled heating medium through a third switch valve connected to the outer cylinder of the tower and also configured to receive the heating medium through a fourth switch valve from the outer cylinder of the tower;
    a first pipe line configured to receive ozone through a fifth switch valve from the inner cylinder of the tower;
    a water flow ejector configured to exhaust the ozone received from the inner cylinder of the tower into water to be ejected downstream from the apparatus;
    a tank configured to supply oxygen gas to the inner cylinder of the tower;

a second pipe line connected to the inner cylinder of the tower at an end opposite to the one end connected to the first switch valve, said second pipeline configured to supply oxygen gas to the inner cylinder of the tower; and a first adjuster connected in the second pipe line and configured to regulate oxygen gas flow to the inner cylinder of the tower.

2. An ozone-producing apparatus, according to claim 1, wherein the improvement further comprises:

a pressure sensor connected inside the inner cylinder of the tower and configured to measure pressure in the inner cylinder;

a second adjuster connected in the second pipe line between the tank and the first adjuster, said second adjuster being configured to regulate oxygen gas pressure;

a flow rate controller connected in the first pipe line and configured to adjust an ozone gas flow rate in the first pipe line; and a pressure controller connected at one end to the tank and configured to control at another end, upon receipt of a first signal from the pressure sensor, operations of the first adjuster, the second adjuster and the flow rate controller.

3. An ozone-producing apparatus including:

an adsorption/desorption tower having an inner cylinder filled with an ozone absorbent and surrounded by an outer cylinder filled with a heating medium;

a generator configured to supply ozone to the inner cylinder of the tower through a first switch valve connected to one end of the inner cylinder of the tower;

a blower configured to circulate oxygen through a second switch valve from the inner cylinder of the tower to the generator;

a cooling source configured to supply a cooled heating medium through a third switch valve connected to the outer cylinder of the tower and also configured to receive the heating medium through a fourth switch valve from the outer cylinder of the tower;

a first pipe line configured to receive ozone through a fifth switch valve from the inner cylinder of the tower;

a water flow ejector configured to exhaust the ozone received from the inner cylinder of the tower into water to be ejected downstream from the apparatus;

a tank configured to supply oxygen gas to the inner cylinder of the tower;

a second pipe line connected to the inner cylinder of the tower at an end opposite to the one end connected to the first switch valve, said second pipeline configured to supply oxygen gas to the inner cylinder of the tower;

a first adjuster connected in the second pipe line and configured to regulate oxygen gas flow to the inner cylinder of the tower;

a temperature sensor connected inside the inner cylinder of the tower and configured to measure a temperature in the inner cylinder; and a temperature controller connected at one end to the tank and configured to control at another end operations of the cooling source upon receipt of a first signal from the temperature sensor.

* * * * *